United States Patent [19]

Gerhardt

[11] Patent Number: 4,655,841

[45] Date of Patent: Apr. 7, 1987

[54] HARDENER COMPOSITION

[75] Inventor: Robert F. Gerhardt, Dix Hills, N.Y.

[73] Assignee: Ulano Corporation, Brooklyn, N.Y.

[21] Appl. No.: 721,475

[22] Filed: Apr. 9, 1985

Related U.S. Application Data

[63] Continuation-in-part of Ser. No. 568,097, Jan. 4, 1984, abandoned.

[51] Int. Cl.$^4$ .................... C08L 29/04; C09K 3/00
[52] U.S. Cl. .................... 106/287.23; 524/557
[58] Field of Search ......... 106/287.13, 187, 287.23, 106/287.24; 568/601; 524/557; 525/61; 8/115.56

[56] References Cited

U.S. PATENT DOCUMENTS

| | | | |
|---|---|---|---|
| 2,360,477 | 10/1944 | Dahle | 525/61 |
| 2,382,874 | 8/1945 | Gresham | 568/601 |
| 2,469,320 | 5/1949 | Swan | 524/557 |
| 2,473,994 | 6/1949 | Gresham | 568/601 |
| 2,502,433 | 4/1950 | Copenhaver | 568/601 |
| 2,785,948 | 3/1957 | Abrams | 568/601 |
| 2,837,575 | 6/1958 | Waters et al. | 568/594 |
| 2,868,773 | 1/1959 | Kress | 106/125 |
| 3,080,207 | 3/1963 | Tanabe et al. | 525/61 |
| 3,215,489 | 11/1965 | Kress | 8/120 |
| 3,954,886 | 5/1976 | Langdon | 252/174.21 |

FOREIGN PATENT DOCUMENTS 0058928  2/1982  European Pat. Off. ........... 568/601

Primary Examiner—Theodore Morris
Attorney, Agent, or Firm—Charles E. Baxley

[57] ABSTRACT

A stable hardener composition for films of poly (vinyl alcohol) or poly (vinyl acetate) which preferably comprises an alkanol solution containing about 5 to 80% by weight of an aliphatic dialdehyde-bis (di-lower alkyl acetal), from 0 to about 1% by weight of water, and from about one to 30% by weight of the amount of said acetal of a strong Bronsted or Lewis acid, said alkanol being a primary alcohol containing 1 to 6 carbon atoms. The solution may also contain soluble thickening agents and dyes.

12 Claims, No Drawings

HARDENER COMPOSITION

This application is a continuation-in-part of patent application Ser. No. 568,097, filed Jan. 4, 1984 now abandoned.

This invention relates to hardener compositions. It particularly relates to hardener compositions for improving the durability, solvent resistance and scratch resistance of organic polymeric films carrying polar groups such as hydroxyl, sulfhydryl, carboxy, carboxamide, carboalkoxy, acetoxy and the like.

BACKGROUND OF THE INVENTION

The use of polymer films as coatings is quite common. These films, frequently formed of polyvinyl alcohol and/or polyvinyl acetate, usually have a low degree of hardness which reduces their durability and scratch resistance. Besides, many of these films have poor resistance to moisture and solvents. Various means have been employed to overcome these deficiencies. These means usually include the treatment of the films with hardening solutions which contain substances which react with the film to give it the desired hardness. Such substances which include polyvalent inorganic metallic salts, organo-metallic compounds, aliphatic mono-and di-aldehydes, and the like, have long been used effectively to post harden photographic gelatin films, poly(vinyl alcohol) screen printing stencils, and lithographic printing plates. Examples of such hardening compositions and their use are disclosed in U.S. Pat. Nos. 2,407,061 and 2,720,468.

While these compositions have been of some use, such use has been limited because of certain deficiencies, such as a short shelf life, excessive toxicity and inadequate hardening effect. In particular, in the prior art compositions, the hardening aldehyde agents or precursors thereof have to be mixed with the strongly acidic aqueous or non-aqueous system just prior to use since the stability of these acidic solutions of the aldehydes or aldehyde precursors is measured only in hours. This requires the provision of a two-part system, the parts being mixed just prior to use.

U.S. Pat. No. 2,785,948 discloses compositions containing acetals of mono- or di-adelhydes, which compositions are useful in preventing shrinkage of cellulosic textile materials. These compositions contain large amounts of water, in the range from 46 to 95%, and are unsuitable for the purposes and practice of this invention.

It is, accordingly, an object of this invention to provide a single phase (i.e. a 1-part) composition which produces a good hardening effect when applied to organic polymer films.

It is another object of this invention to provide hardener compositions which are substantially non-toxic in normal use.

It is a further object of this invention to provide hardener compositions having a substantially unlimited shelf life.

Other objects will appear from the description which follows.

THE PRESENT INVENTION

In accordance with this invention there are provided stable hardener compositions comprised of one or more lower alkyl acetals of mono and polyaldehydes and a strong acid, dissolved in a lower alkanol.

The acetals suitable in the practice of this invention include acyclic and alicyclic acetals of aliphatic and aromatic mono-or polyaldehydes such as

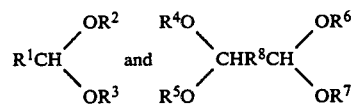

where $R^1$ is hydrogen or a cyclic or acyclic alkane, alkene or arene having 1–7 carbon atoms, $R^8$ is a divalent cyclic or acyclic alkane, alkene or arene having 1–6 carbon atoms, and $R^2$–$R^7$ are the same or different cyclic or acyclic alkanes or alkenes having 1–6 carbon atoms, and more particularly, benzaldehyde-dimethylacetal, glyoxal-bis (diallylacetal), malonaldehyde-bis (diethyl acetal), malonaldehyde-bis (dimethyl acetal), glyoxal-bis (diethyl acetal), propionaldehyde-dimethyl acetal, as well as trioxane, 2, 5-dimethoxy-tetrahydrofurane, and the like. Preferably the aldehydes are aliphatic dialdehydes containing 2 to 6 carbon atoms such as glyoxal, malonaldehyde, succinaldehyde and the like. The lower alkyls contain 1 to 6 carbon atoms. The methyl acetals are preferred because they are generally more reactive than acetals of higher alcohols due to the rapid displacement and volatilization of methanol under acidic conditions. A preferred acetal is malonaldehyde bis (dimethylacetal).

Any strong Bronsted or Lewis organic or inorganic acid may be used. The acid serves to catalyze the cross-linking reaction between the acetal and reactive groups on the organic polymer to produce the hardening effect. Suitable acids include sulfuric acid, boron trifluorideether complex, hydrochloric acid, and lower alkyl sulfonic acids such as methane and ethane sulfonic acids. If the acid is used in an aqueous solution it is preferred to use a highly concentrated solution to reduce the amount of water in the hardener compositions.

The lower alkanol solvents are preferably primary alcohols having from 1 to 6 carbon atoms, i.e., methanol, ethanol, n-propanol, n-butanol, n-amyl alcohol, and n-hexanol. Because of its high volatility methanol is preferred.

Preferably, the stable hardener compositions of this invention contain a flow control agent which is a surfactant that is added to aid in the uniform distribution of the hardener on the film on which it is applied. Any acidresistant surfactant dispersible in a primary lower alkanol having from 1 to 6 carbon atoms may be used. A preferred surfactant is Fluorad FC 430, available from the 3M Company, which is a non-ionic fluorochemical.

The stable hardener compositions of this invention contain from about 5 to 80% by weight of the acetal, from 0 to about 2%, preferably to about 0.6%, and more preferably from 0.3% to about 0.6%, by weight of water, and about 1 to 30% by weight of the amount of the acetal of the strong Bronsted or Lewis acid in a solution of the primary alkanol having from 1 to 6 carbon atoms. Preferably, the solution also contains a flow control agent in a concentration of up to about 0.5% by weight.

If desired, colorants, preferably dyes soluble in the alkanol solvent and resistant to the acid, may be added. An example of such a dye is Methyl Red. The dye may be present in concentrations up to about 0.1% by weight.

In preparing the stable hardener compositions of this invention the desired amount of each ingredient is added sequentially and in any order with stirring to the primary alcohol, and the stirring is continued until solution is complete.

The invention will become clearer from the examples which follow. These examples are given only by way of illustration and are not to be considered as limiting.

EXAMPLE 1

A hardener solution, prepared as described above, contained in parts by weight:

| | |
|---|---|
| malonaldehyde-bis (dimethylacetal) | 465 |
| methane sulfonic acid (70% in water) | 46 |
| Fluorad FC 430 | 0.4 |
| methanol | 2,484 |

EXAMPLE 2

A hardener solution prepared as described above contained in parts by weight:

| | |
|---|---|
| malonaldehyde-bis (dimethylacetal) | 800 |
| methane sulfonic acid (70% in water) | 70 |
| Fluorad FC 430 | 0.75 |
| methanol | 3,000 |

EXAMPLE 3

A hardener solution, prepared as described above, contained in parts by weight:

| | |
|---|---|
| malonaldehyde-bis (dimethylacetal) | 465 |
| methane sulfonic acid (70% in water) | 46 |
| Fluorad FC 430 | 0.4 |
| Methyl Red | 0.01 |
| methanol | 2,484 |

EXAMPLE 4

A hardener solution, prepared as described above, contained in parts by weight:

| | |
|---|---|
| malonaldehyde-bis (dimethylacetal) | 55 |
| methane sulfonic acid (70% in water) | 5 |
| Fluorad FC 430 | 0.05 |
| Methyl Orange | 0.001 |
| methanol | 300 |

EXAMPLE 5

A hardener solution, prepared as described above, contained in parts by weight:

| | |
|---|---|
| malonaldehyde-bis (dimethylacetal) | 500 |
| sulfuric acid (70% in water) | 30 |
| Fluorad FC 430 | 0.3 |
| Methyl Red | 0.01 |
| methanol | 2,500 |

EXAMPLE 6

A hardener solution, prepared as described above, contained in parts by weight:

| | |
|---|---|
| glyoxal-bis (diethylacetal) | 500 |
| ethane sulfonic acid | 40 |
| Fluorad FC 430 | 0.4 |
| Methyl Red | 0.01 |
| methanol | 2,600 |

EXAMPLE 7

A hardener solution, prepared as described above, contained in parts by weight:

| | |
|---|---|
| malonaldehyde-bis (dimethylacetal) | 465 |
| methane sulfonic acid (70% in water) | 46 |
| Fluorad FC 430 | 0.4 |
| Methyl Red | 0.01 |
| n-butanol | 2,484 |

EXAMPLE 8

A hardener solution, prepared as described above, contained in parts by weight:

| | |
|---|---|
| malonaldehyde-bis (dimethylacetal) | 450 |
| methane sulfonic acid (70% in water) | 47 |
| Fluroad FC 430 | 0.4 |
| Methyl Red | 0.01 |
| ethanol (anhydrous) | 2,400 |

EXAMPLE 9

A hardener solution, prepared as described above, contained in parts by weight:

| | |
|---|---|
| glyoxal-bis (diethylacetal) | 480 |
| ethane sulfonic acid | 40 |
| Fluorad FC 430 | 0.4 |
| Methyl Red | 0.01 |
| ethanol (anhydrous) | 2,500 |

The compositions described in Examples 1 to 9 are exceptionally stable. They showed no formation of a precipitate, separation or discoloration after standing at ambient temperature (about 18° to 22° C.) for almost one year. Also, their hardening action was undiminished. Hardener compositions now on the market do not show such stability.

The compositions of examples 1 to 9 are readily applied to the plastic film by any convenient method such as brushing, spraying, dipping, roller coating, knife coating, and the like. Examples 10 and 11 illustrate the use of these compositions in hardening films.

EXAMPLE 10

A liquid poly(vinyl alcohol)-poly-(vinyl acetate)-diazo sensitized screen printing emulsion (available from Ulano Corporation, Brooklyn, New York) was scoop-coated onto a 280 mesh polyester fabric stretched on a rigid rectangular printing frame, and allowed to dry at ambient temperature in a yellow safe-lit room. The coated screen was then exposed through a line positive, developed with a water spray to wash away the unexposed image areas, and dried at ambient temperature. The stencil was mounted horizontally and brush-coated liberally on both sides with the composition of Example 3 without run-off. After drying at ambient temperature for one hour, the stencil was flushed with a water spray to remove any excess acetal and acid and dried at ambient temperatures. After drying the stencil was found to be resistant to all organic solvent-based and water-based screen inks. This treatment of the stencil with the hardener composition increased its use from 300 prints of water-based ink untreated to 100,000 prints treated. Furthermore, the treatment rendered the stencil essentially permanent since it could no longer be removed by usual stencil removing substances such as sodium hypochlorite or metaperiodate solutions.

EXAMPLE 11

A liquid poly(vinyl alcohol)-poly-(vinyl acetate)-diazo sensitized screen printing emulsion (available from Ulano Corporation, Brooklyn, New York) was scoop-coated onto a 280 mesh polyester fabric stretched on a rigid rectangular printing frame, and allowed to dry at ambient temperature in a yellow safe-lit room. The coated screen was then exposed through a line positive, developed with a water spray to wash away the unexposed image areas, and dried at ambient temperatures. The stencil was mounted horizontally and brush-coated liberally on both sides with the composition of Example 7 without run-off. After drying at 50° C. for one hour, the stencil was flushed with a water spray to remove any excess acetal and acid and dried at ambient temperature. After drying the stencil was found to be resistant to all organic solvent-based and water-based screen inks. This treatment of the stencil with the hardener composition increased its use from 300 prints of water-based ink untreated to 100,000 prints treated. Furthermore, the treatment rendered the stencil essentially permanent since it could no longer be removed by such usual stencil removing substances as sodium hypochlorite or metaperiodate solutions.

I claim:

1. A stable hardener composition, for organic polymeric films carrying polar groups such as hydroxyl, sulfhydryl, carboxy, carboxamide, carbo alkoxy or acetoxy, which hardener composition comprises an alkanol solution containing about 5 to 80% by weight of an acyclic or alicyclic acetal of an aliphatic or aromatic mono- or polyaldehyde selected from a group consisting of

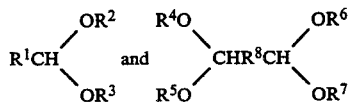

wherein $R^1$ is hydrogen or a cyclic or acyclic alkane, alkene or arene having 1-7 carbon atoms, $R^8$ is a divalent cyclic or acyclic alkane, alkene or arene having 1-6 carbon atoms, and $R^2$-$R^7$ are the same or different cyclic or acyclic alkanes or alkenes having 1-6 carbon atoms and trioxane and 2,5-dimethoxy-tetrahydrofurane, from 0 to about 2% by weight of water, and from about 1 to 30% by weight of amount of said acetal of a strong Bronsted or Lewis acid, said alkanol being a primary alcohol having from 1 to 6 carbon atoms and said acetal having 3 to 32 carbon atoms.

2. A stable hardener composition for films of poly (vinyl alcohol) or poly (vinyl acetate), co-poly (vinyl alcohol), which comprises an alkanol solution containing about 5 to 80% by weight of an aliphatic dialdehyde-bis-(di-lower alkyl acetal), from 0 to about 2% by weight of water, and from about 1 to 30% by weight of the amount of said acetal of a strong Bronsted or Lewis acid, said alkanol being a primary alcohol having from 1 to 6 carbon atoms, said dialdehyde having from 2 to 6 carbon atoms, and said alkyl group having from 1 to 6 carbon atoms.

3. A stable hardener composition according to claim 2 wherein the amount of water is from 0 to about 0.6% by weight.

4. A stable hardener composition according to claim 3 wherein the amount of water is from about 0.3% to about 0.6% by weight.

5. A stable hardener composition according to claim 4 wherein the alkanol is methanol.

6. A stable hardener composition according to claim 5 wherein the dialdehyde is malonaldehyde.

7. A stable hardener composition according to claim 6 wherein the dialdehyde is malondialdehyde.

8. A stable hardener composition according to claim 7 wherein the alkyl group in the acetal is methyl.

9. A stable hardener composition according to claim 8 wherein the strong Bronsted or Lewis acid is sulfuric acid, hydrochloric acid, boron trifluoride-ether complex, methane sulfonic acid, or ethane sulfonic acid.

10. A stable hardener composition according to claim 2 or 9 which contains up to about 10% by weight of a thickening agent which is dispersible in the alkanol.

11. A stable hardener composition according to claim 10 wherein the thickening agent is fumed silica.

12. A stable hardener composition containing in parts by weight:

| | |
|---|---|
| malonaldehyde-bis (dimethylacetal) | 465 |
| methane sulfonic acid (70% by weight in water) | 46 |
| Non-ionic fluorochemical surfactant | 0.4 |
| Methyl Red | 0.01 |
| methanol | 2,484 |

* * * * *